United States Patent
Lee et al.

(10) Patent No.: US 11,671,036 B2
(45) Date of Patent: Jun. 6, 2023

(54) SYSTEM AND DRIVING DEVICE FOR BLDC MOTOR

(71) Applicant: DAS Co., Ltd., Gyeongsangbuk-do (KR)

(72) Inventors: Kwang Sin Lee, Gyeonggi-do (KR); In Ho Jo, Gyeonggi-do (KR)

(73) Assignee: DAS CO., LTD., Gyeongsangbuk-Do (KR)

( * ) Notice: Subject to any disclaimer, the term of this patent is extended or adjusted under 35 U.S.C. 154(b) by 160 days.

(21) Appl. No.: 17/084,306

(22) Filed: Oct. 29, 2020

(65) Prior Publication Data
US 2021/0135608 A1    May 6, 2021

(30) Foreign Application Priority Data
Oct. 30, 2019    (KR) .......................... 10-2019-0136859

(51) Int. Cl.
*H02P 6/08*    (2016.01)
*H02P 6/182*    (2016.01)

(52) U.S. Cl.
CPC ............... *H02P 6/08* (2013.01); *H02P 6/182* (2013.01)

(58) Field of Classification Search
CPC .................................. H02P 6/08; H02P 6/182
USPC ......................................... 318/400.1, 400.13
See application file for complete search history.

(56) References Cited

U.S. PATENT DOCUMENTS

2015/0054440 A1* 2/2015 Dernebo .................. H02P 6/08
318/400.23

FOREIGN PATENT DOCUMENTS

| EP | 2955840 A1 | * 12/2015 | ............. H02K 11/28 |
| JP | 2006311727 A | * 11/2006 | ............. H02K 21/16 |
| JP | 2006311727 A | 11/2006 | |
| JP | 2008022590 A | * 1/2008 | ............. B25J 19/06 |
| JP | 2008022590 A | 1/2008 | |
| JP | 2011205826 A | * 10/2011 | |
| JP | 2011205826 A | 10/2011 | |
| KR | 101079050 B1 | 11/2011 | |
| KR | 1020130031728 | 3/2013 | |
| KR | 102019004806 | 5/2019 | |

OTHER PUBLICATIONS

Korean Application N. 10-2019-0136859; Korean Office Action, dated Jul. 13, 2021; 13 pgs.

* cited by examiner

*Primary Examiner* — Jorge L Carrasquillo
(74) *Attorney, Agent, or Firm* — Tarolli, Sundheim, Covell & Tummino LLP

(57) ABSTRACT

A BLDC motor system is provided, which includes a motor provided with a stator forming a tubular space in which a center shaft exists and having an inner side for the center shaft, on which a plurality of coil units generating a magnetic field are formed, and a rotor located in the tubular space and having fixed magnet units arranged on an outer side for the center shaft, a skew having a predetermined slope against the center shaft being formed on a boundary between one of the fixed magnet units and the adjacent fixed magnet unit; and a driving module provided with a driving circuit supplying a power for driving the motor to the coil units, and a controller rotating the rotor by switching the driving circuit and performing switching so that the power being supplied from the driving circuit to the coil units forms a sine wave.

5 Claims, 13 Drawing Sheets

[FIG. 1A]
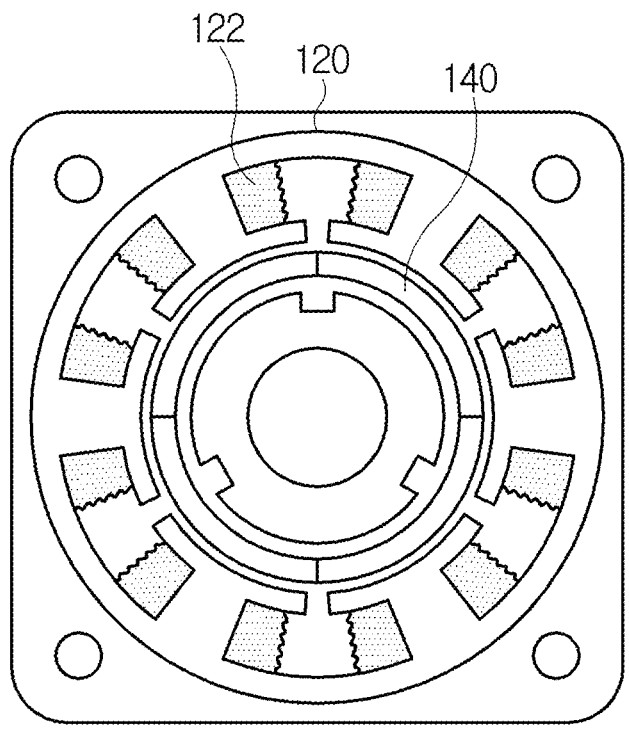

[FIG. 1B]
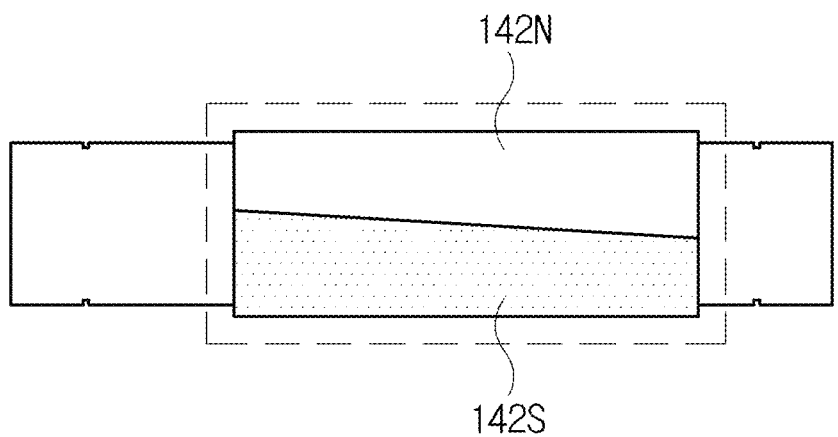

[FIG. 2A]
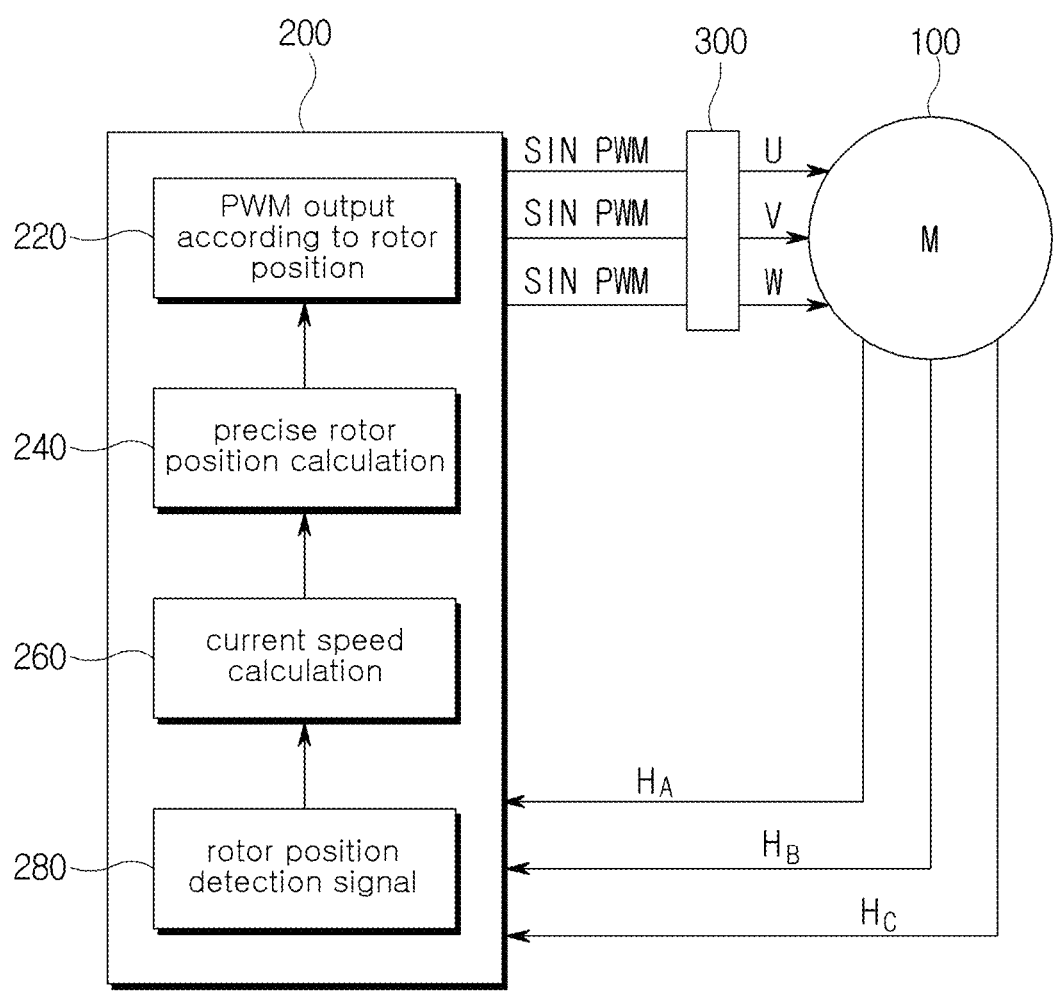

[FIG. 2B]
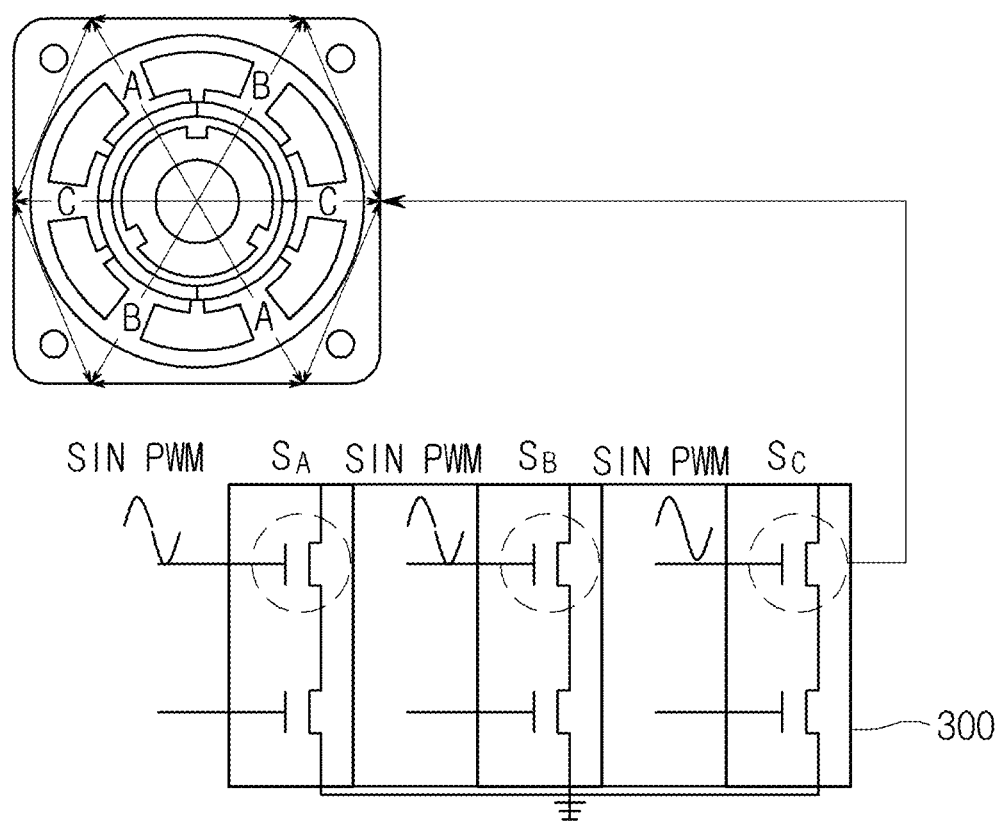

[FIG. 3]
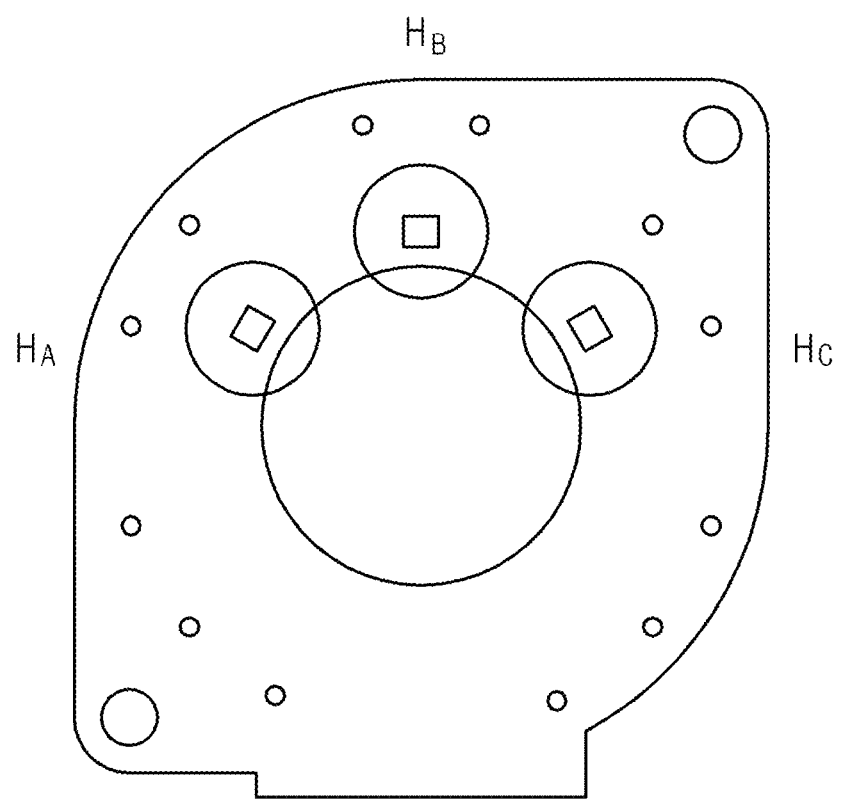

[FIG. 4]
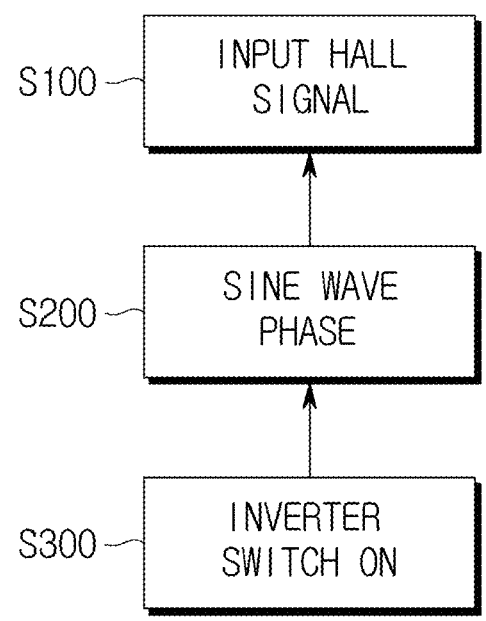

[FIG. 5]
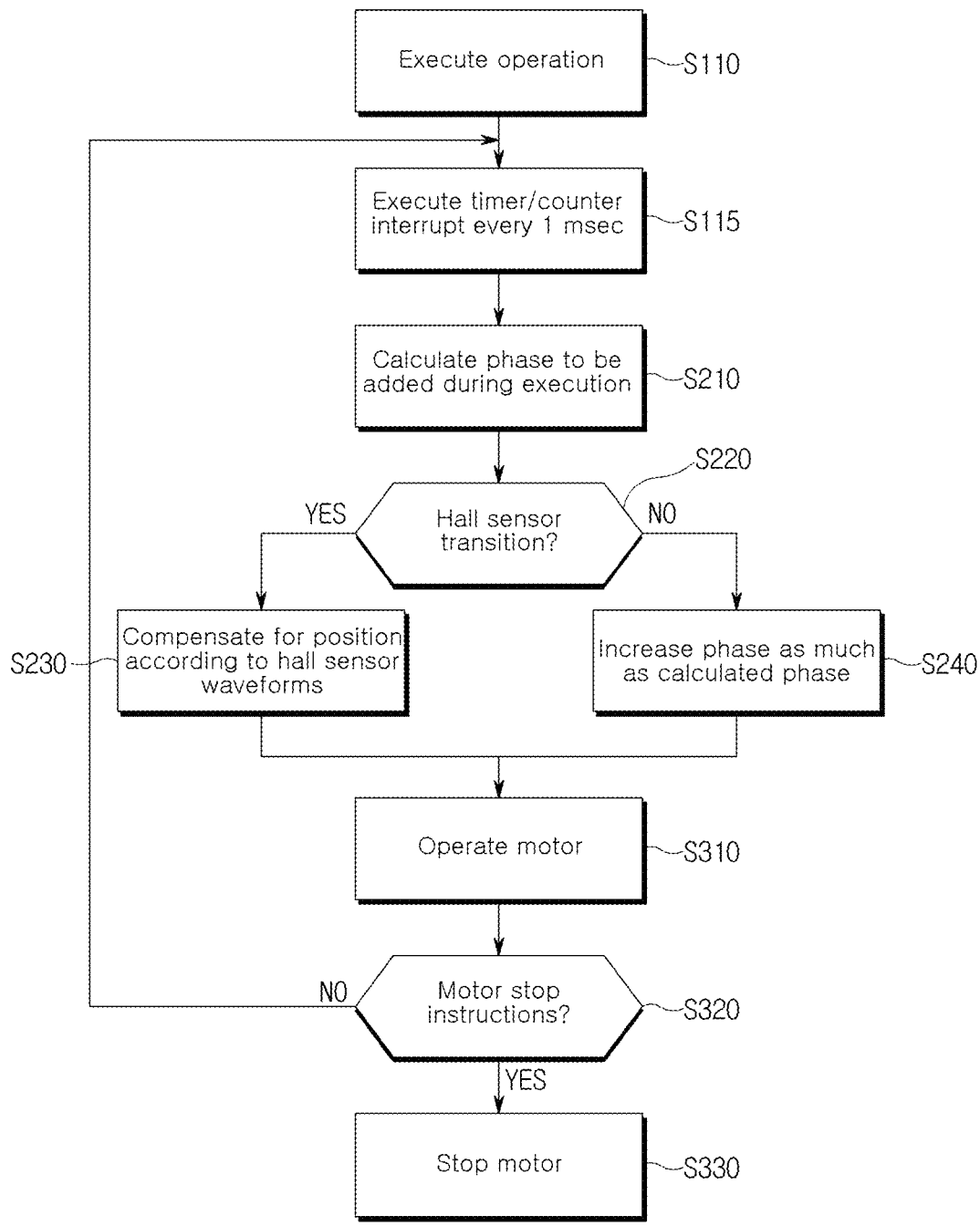

[FIG. 6]
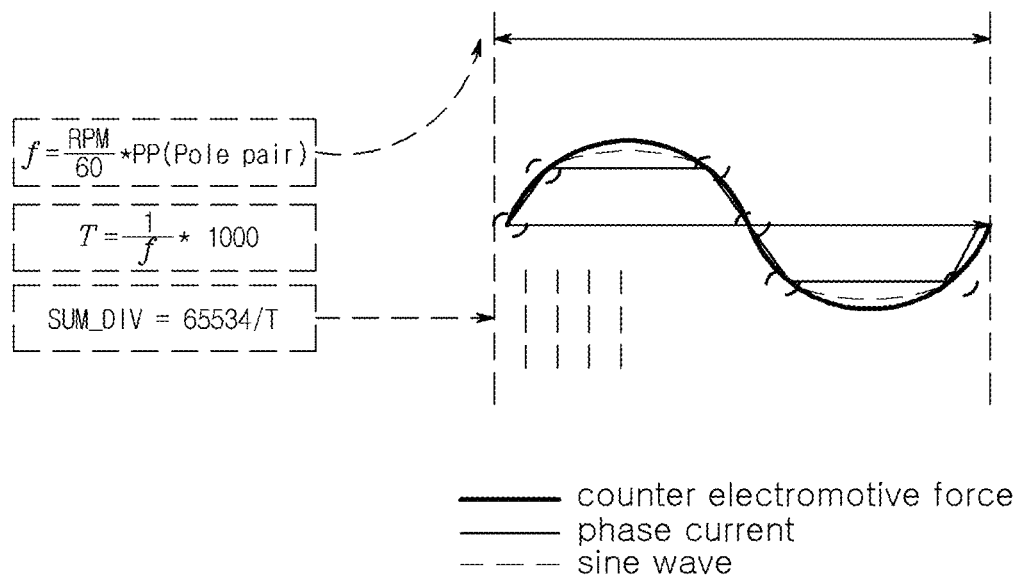

[FIG. 8A]
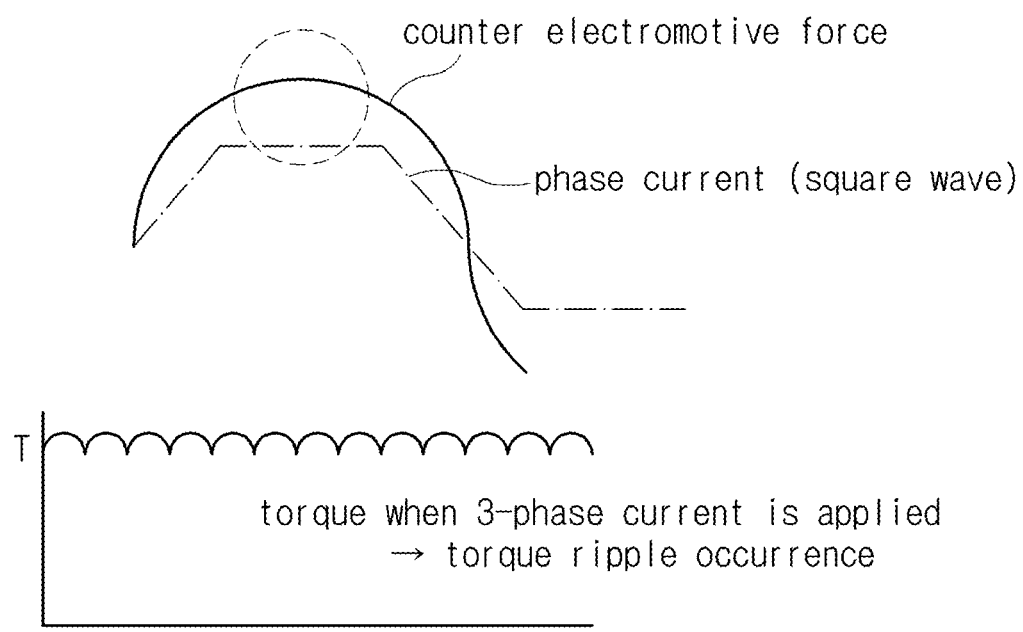

[FIG. 8B]
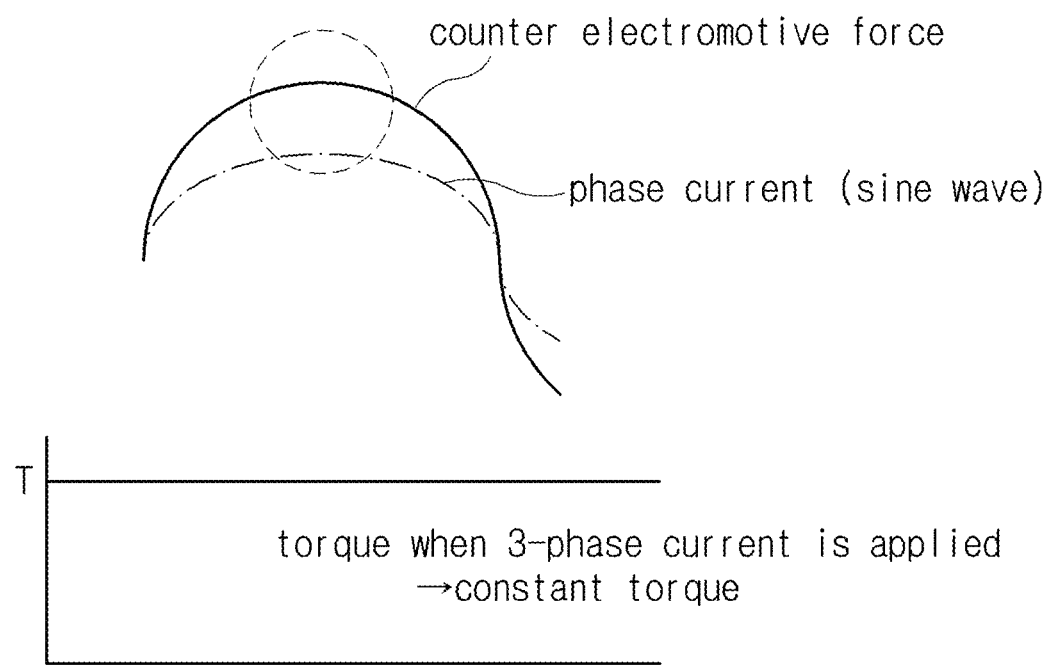

[FIG. 9A]
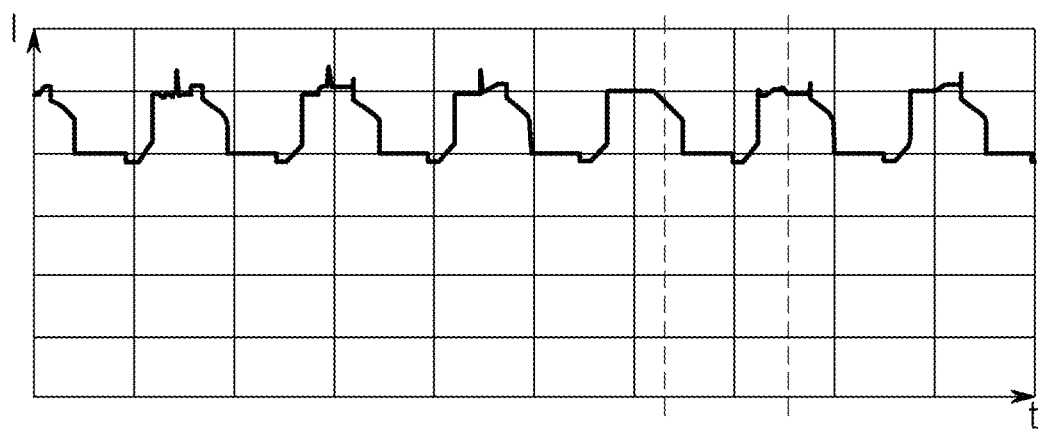

[FIG. 9B]
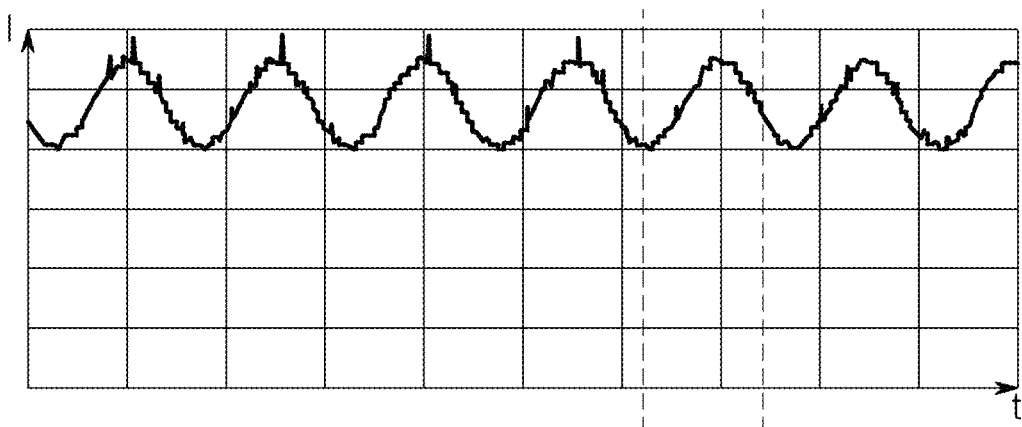

SYSTEM AND DRIVING DEVICE FOR BLDC MOTOR

CROSS-REFERENCE TO RELATED APPLICATION

This application claims priority to Korean Patent Application No. 10-2019-0136859, filed on Oct. 30, 2019, the disclosure of which is incorporated herein by reference in its entirety.

BACKGROUND OF THE INVENTION

Field of the Invention

Exemplary embodiments of the present disclosure relate to a hollow type BLDC motor system provided with a hollow type BLDC motor and a driving circuit for driving the BLDC motor, and more particularly, to a hollow type BLDC motor system which suppresses torque ripple and noise caused by the torque ripple as well as reducing a necessary cogging torque.

Description of the Related Art

As a DC motor, a motor, to which a brush is attached, performs rectification simultaneously with making current flow in a coil through a contact between a commutator and a brush, but in order to overcome the drawback of brush abrasion, a brushless DC electric motor (BLDC motor) is frequently used.

The BLDC motor has been broadly used because it has a large torque and a superior controllability and it can seek quickness. The BLDC motor is classified into inner and outer type BLDC motors in accordance with the location of a rotor.

In an external magnetic (outer) type BLDC motor, a main path of magnetic flux forms a magnetic circuit whereby the magnetic flux progresses from a permanent magnet of a rotor, passes through an air gap and a stator, and then progresses again in a direction of the permanent magnet and a yoke.

In case of an internal magnetic (inner) type, a plurality of T-shaped core portions of a stator core, on which a coil is wound, are formed to project in an inside direction from an outside, and inner longitudinal ends of the respective core portions form a circle having a predetermined diameter. In a space of the circle, a rotor is mounted, to which a cylindrical permanent magnet including a rotating shaft or a ring type permanent magnet attached to a cylindrical yoke, in which the rotating shaft can be included or assembled in the center thereof, is attached. The motor rotation type is the same as that of the external magnetic type.

Because the BLDC motor as described above has a structure in which the magnetic circuit is symmetrically provided in a radial direction around the shaft, vibratory noise in an axial direction is low, and a portion occupied by an air gap is extremely small in the direction of a magnetic path. Accordingly, even if a magnet having a low performance is used or an amount of magnet is decreased, a high magnetic flux density can be obtained, and thus the BLDC motor has advantages of large torque and high efficiency.

The inner type BLDC motor is featured so that it is suitable for the purpose that requires a quick response through lowering of the moment of inertia since the outer diameter of the rotor is smaller than that of the outer type BLDC motor, but it is difficult to obtain a high-speed rotation due to limitations of the mechanical strength of the permanent magnet or the adhesive strength of the permanent magnet with the rotor. In contrast, the outer type BLDC motor is featured so that the moment of inertia is high due to the large outer diameter of the rotor, but it is suitable for the high speed since the permanent magnet can be attached inside the rotor.

However, in the rotor, the permanent magnet is formed to have a structure in which N poles and S poles alternate with each other along a rotary surface, and in this case, a cogging torque is generated due to the cross gap between the N-pole region and the S-pole region. Especially, in case of the inner type BLDC motor being used in the field that requires a low-speed quick response, the cogging torque exerts bad influences on the initial start control and power consumption reduction.

PRIOR ART DOCUMENT

Patent Document (Patent document 1) Korean Patent Publication No. 10-1079050

SUMMARY OF THE INVENTION

The present disclosure provides a hollow type BLDC motor system which suppresses torque ripple and noise caused by the torque ripple as well as reducing a cogging torque of an initial start.

Other aspects and advantages of the present disclosure can be understood by the following description, and become apparent with reference to the embodiments of the present disclosure. Also, it is obvious to those skilled in the art to which the present disclosure pertains that the aspects and advantages of the present disclosure can be realized by the means as claimed and combinations thereof.

In accordance with one aspect of the present disclosure, a BLDC motor system may include a motor provided with a stator forming a tubular space in which a center shaft exists and having an inner side for the center shaft, on which a plurality of coil units generating a magnetic field are formed, and a rotor located in the tubular space and having fixed magnet units arranged on an outer side for the center shaft, on which a plurality of polarities alternate in a rotating direction of the center shaft, a skew having a predetermined slope against the center shaft being formed on a boundary between one of the fixed magnet units and the adjacent fixed magnet unit; and a driving module provided with a driving circuit supplying a power for driving the motor to the coil units, and a controller rotating the rotor by switching the driving circuit and performing switching so that the power being supplied from the driving circuit to the coil units forms a sine wave.

The sine wave may have a phase of 0 degree in case that the coil center shaft of the stator passes through a start point of the skew.

The BLDC motor system may further include a rotation position sensing means for discriminating a relative rotation position between the fixed magnet unit and the coil unit.

The rotation position sensing means may include three hall sensors formed on one of two cover plates closing the tubular space of the stator at both ends thereof and maintaining an electrical angle interval of 120 degrees, the hall sensors sensing an approach of a magnetic reference point provided on the rotor.

The controller may calculate a rotation speed of the motor from a signal for the relative rotation position, calculate the relative rotation position more precisely, and adjust a frequency and a phase of the sine wave in accordance with the calculated relative rotation position and rotation speed.

The stator may be provided with 6 coil units in total, and the rotor may be provided with 4 fixed magnet units in total.

The rotor may join with a spiral guide provided inside the rotor to convert a rotary motion into a linear motion.

In accordance with another aspect of the present disclosure, a BLDC motor driving device driving a BLDC motor may include a driving circuit supplying a power for driving the motor to a coil unit of the BLDC motor; a controller rotating a rotor of the BLDC motor by switching the driving circuit and performing switching so that the power being supplied from the driving circuit to the coil unit forms a sine wave; and a rotation signal receiving unit receiving a signal for a relative rotation position between the coil unit of the BLDC motor and a fixed magnet unit formed on the rotor, wherein the controller calculates a rotation speed of the BLDC motor from the signal for the relative rotation position, calculates the relative rotation position more precisely, and adjusts a frequency and a phase of the sine wave in accordance with the calculated relative rotation position and rotation speed.

The rotation signal receiving unit may receive an on/off signal from hall sensors disposed on the BLDC motor at a predetermined separation angle, and the controller may calculate the rotation speed of the BLDC motor from a time interval of change time points of the received on/off signal, and may more precisely calculate the relative rotation position from the number of reference time intervals lapsed from the change points of the received on/off signal.

The controller may perform switching so that the power being supplied to the coil unit forms a direct current until one or two of the change points of the on/off signal arrive in case of an initial driving of the BLDC motor whose control has been ceased.

The BLDC motor system of the present disclosure having the above-described configuration has the advantage that it is possible to suppress a torque ripple and a noise caused by the torque ripple as well as reducing a cogging torque of an initial start.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1A is a cross-sectional view illustrating a stator unit and a rotor unit of a BLDC motor according to an embodiment of the present disclosure;

FIG. 1B is a plan view illustrating a skew structure formed on an outer side of a rotor of a BLDC motor according to an embodiment of the present disclosure;

FIGS. 2A and 2B are block diagrams schematically illustrating a driving circuit and a controller of a driving module according to an embodiment of the present disclosure;

FIG. 3 is a plan view illustrating an embodiment of a rotation position sensing means that can be applied to a BLDC motor according to an aspect of the present disclosure;

FIG. 4 is a conceptual flowchart illustrating a process of calculating a rotation speed and a precise rotation position from on/off signal combinations of hall sensors $H_A$, $H_B$, and $H_C$ of FIG. 3;

FIG. 5 is a detailed flowchart of processes of calculating a precise rotation position of FIG. 4;

FIG. 6 is a conceptual diagram explaining a relationship between mathematical definitions of sine wave control according to an aspect of the present disclosure and sine waves;

FIGS. 8A and 8B are graphs illustrating counter electromotive forces and torques during motor driving according to the related art and the present disclosure to explain an improved function of a hollow type BLDC motor system according to an aspect of the present disclosure; and FIGS. 9A and 9B are detected waveform diagrams of the above-described torque ripple suppression effect as seen as a current flow of a MOSFET switch element actually driving a hollow type BLDC motor.

DESCRIPTION OF SPECIFIC EMBODIMENTS

Figure 7:
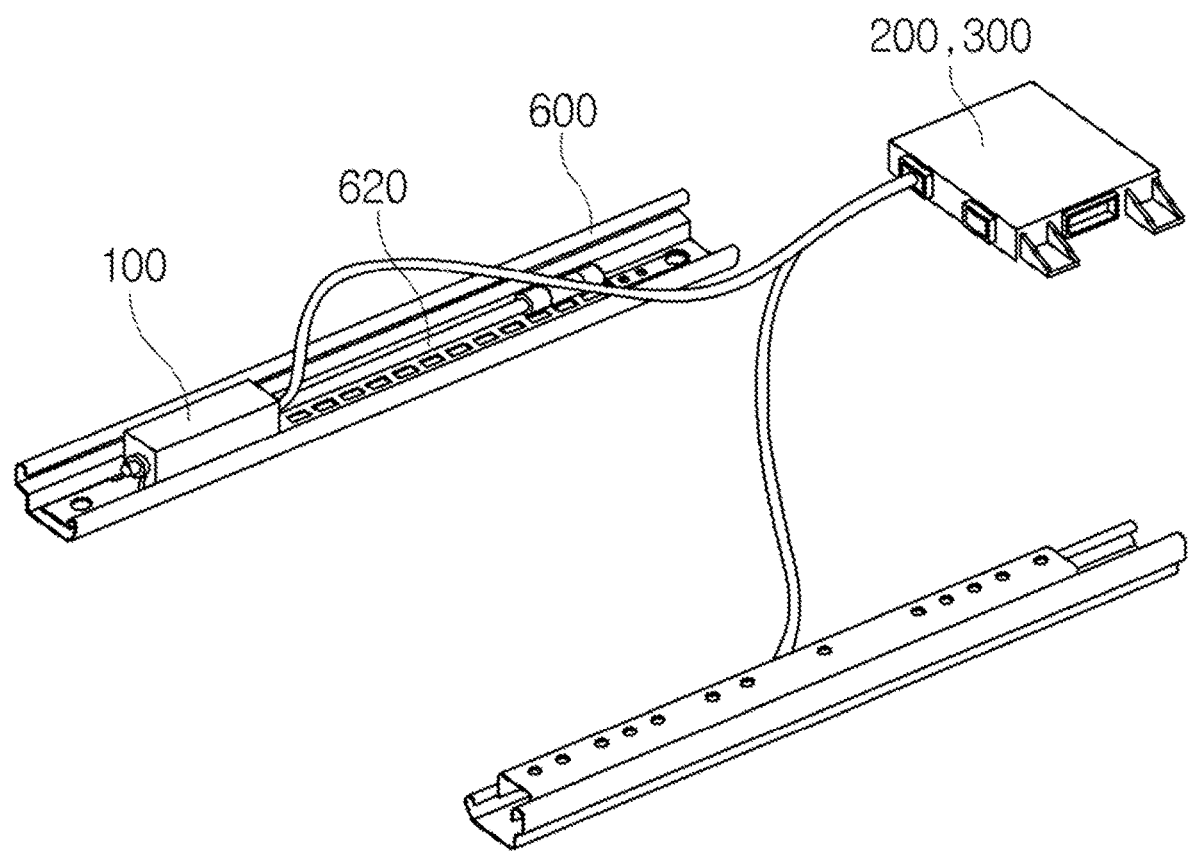
FIG. 7 is a perspective view illustrating an application example of a hollow type BLDC motor system according to an aspect of the present disclosure.

In describing the present disclosure, although the terms "first, second, and so forth" may be used to describe diverse elements, components are not limited by the terms. The terms are used only to discriminate one element from other elements. For example, without departing from the scope of the present disclosure, a first element may be called a second component, and in a similar manner, the second component may also be called the first component.

It may be understood that the term "connected to" or "coupled to" being used to designate a connection or coupling of one element to another element includes both a case that an element is "directly connected or coupled to" another element and a case that one element is connected or coupled to another element via still another element.

In the following description of the present disclosure, the terms used are merely for explaining specific embodiments, but do not intend to limit the present disclosure. In the description, a singular expression may include a plural expression unless clearly differently meant in context.

The term "comprises" and/or "is provided with" used in the description is to designate the existence of features, figures, steps, operations, constituent elements, parts, or combinations thereof described in the description, and it may be understood that possibility of existence or addition of one or more other features, figures, steps, operations, constituent elements, parts, or combinations thereof is not pre-excluded.

Further, shapes and sizes of the elements in the drawing may be exaggerated for clearer explanation.

A BLDC motor system according to an aspect of the present disclosure includes an inner/hollow type BLDC motor in which a rotor formed with skew-applied fixed magnet units is rotated, and a driving module driving the BLDC motor by applying a sine wave shaped driving power to the BLDC motor. In case of an independent product, the driving module may be expressed as a driving device.

FIG. 1A is a cross-sectional view illustrating a stator 120 unit and a rotor 140 unit of a BLDC motor according to an embodiment of the present disclosure.

FIG. 1B illustrates a skew structure formed on an outer side of a rotor 140 of a BLDC motor according to an embodiment of the present disclosure. As illustrated, a boundary between an N-pole fixed magnet unit 142N and an S-pole fixed magnet unit 142S of the rotor has a slope at a predetermined angle with respect to an axial direction.

As illustrated, the BLDC motor may include a stator 120 forming a tubular space in which a center shaft exists and having an inner side for the center shaft, on which a plurality of coil units 122 generating a magnetic field are formed, and a rotor 140 located in the tubular space and having fixed magnet units 142 arranged on an outer side for the center shaft, on which a plurality of polarities alternate in a rotating direction of the center shaft, wherein a skew having a predetermined slope against the center shaft may be formed on a boundary between one of the fixed magnet units and the adjacent fixed magnet unit.

Further, the BLDC motor may further include a rotation position sensing means for sensing a relative rotation position between the stator 120 and the rotor 140, and more particularly, a relative rotation position between the coil unit and the fixed magnet unit 142N or 142S.

For example, three hall sensors (which maintain an electrical angle interval of 120 degrees with each other), which senses an approach of a magnetic reference point provided on the rotor 140, may be formed on one of two cover plates closing the tubular space of the stator 120 at both ends of the tubular space. Here, the electrical angle means an angle which is denoted based on an angle of one cycle that is determined as 360 degrees regardless of s spatial angle in a sine wave alternating current, and in case that 6 coil units and 4 fixed magnet units are provided as illustrated, it can be known that the electrical angle interval of 120 degrees corresponds to a mechanical interval of 60 degrees.

As illustrated, the stator 120 is provided with 6 coil units 122 in total. Although it is general at present to implement the coil units 122 in the form in which a coil is wound on bobbins successively provided on a stator frame as illustrated, another dynamic magnetic field generation means, such as a loop core, may be used in another implementation. In the coil unit 122, the polarity and the magnitude of a magnetic field diverging by a driving power being supplied by the driving module are determined.

As illustrated, the rotor 140 is provided with 4 fixed magnet units in total. Although it is expressed in the drawing that magnetic particles are magnetized and formed as the fixed magnet units 142N and 142S, a combination of bar/plate type permanent magnets or an electromagnet may be implemented in other implementations. The fixed magnet units 142N and 142S maintain constant polarities even if they are implemented as the electromagnets.

FIGS. 2A and 2B schematically illustrate a driving circuit and a controller of a driving module according to an embodiment of the present disclosure.

The driving module may include a driving circuit 300 supplying a power for driving the motor to the coil units 122, and a controller 200 rotating the rotor by switching the driving circuit and performing switching so that the power being supplied from the driving circuit 300 to the coil units 122 forms a sine wave. Here, the controller 200 may be implemented as firmware operating on a driving/control IC, software, logic element connection, or digital/analog control circuit, and is used as the concept including all of them.

Meanwhile, the driving module composed of the driving circuit 300 and the controller 200 may be embodied as an independent BLDC motor driving device separately from the motor 100, and in case of such an independent BLDC motor driving device, it is suitable to use the same in driving the BLDC motor according to the present disclosure, but it is also possible to use the same in driving the BLDC motor in the known technology or a BLDC motor to be developed in future.

A BLDC motor driving device driving the BLDC motor as described above may include a driving circuit 300 supplying a power for driving the motor to a coil unit of the BLDC motor; a controller 200 rotating a rotor of the BLDC motor by switching the driving circuit and performing switching so that the power being supplied from the driving circuit to the coil unit forms a sine wave; and a rotation signal receiving unit 280 receiving a signal for a relative rotation position between the coil unit of the BLDC motor and a fixed magnet unit formed on the rotor.

Here, the controller 200 performs an improved function of calculating a rotation speed of the BLDC motor from the signal for the relative rotation position, calculating the relative rotation position more precisely, and adjusting a frequency and a phase of the sine wave in accordance with the calculated relative rotation position and rotation speed.

For this, the controller 200 may include a current speed calculation unit 260 calculating the rotation speed of the BLDC motor from the signal for the relative rotation position; a position precision calculation unit 240 calculating the relative rotation position more precisely from the signal for the relative rotation position; and a driving signal output unit 220 outputting a driving signal for the driving circuit 300 so that the sine wave can be formed with the frequency and the phase determined in accordance with the calculated relative rotation position and rotation speed.

It is expressed in the drawing that the rotation signal receiving unit 280 is also included in the controller 200, and it can be implemented by internal function blocks of a microcomputer together with the current speed calculation unit 260, the position precision calculation unit 240, and the driving signal output unit 220 since such an implementation type reflects easiness in embodiment.

The rotation signal receiving unit 280 receives the signal for the relative rotation position from the BLDC motor. First, a rotation position sensing means for sensing the relative rotation position between the fixed magnet unit of the rotor and the coil unit of the stator in the BLDC motor will be described.

The controller 200 controls the sine wave to have a phase of 0 degree in case that the center shaft of the coil 122 of the stator passes through a start point of the skew.

FIG. 3 illustrates an embodiment of a rotation position sensing means that can be applied to a BLDC motor according to an aspect of the present disclosure.

As illustrated, the rotation position sensing means is implemented by three hall sensors $H_A$, $H_B$, and $H_C$ provided on a front cover plate closing the tubular space of the stator 120 to sense an approach of a magnetic reference point provided on the rotor 140. Here, the hall sensor $H_A$ and the hall sensor $H_B$, or the hall sensor $H_B$ and the hall sensor $H_C$ have a rotation interval of 120 degrees in electrical angle.

The hall sensors $H_A$, $H_B$, and $H_C$ are fixed to the stator, and sense magnetism from a magnetic signal generation means provided on the rotating rotor. Although a separate permanent magnet may be provided on the rotor as the magnetic signal generation means, the hall sensors can sense the magnetic signal being generated from the 4 divided fixed magnet units being magnetized and formed.

In the latter case, the hall sensors $H_A$, $H_B$, and $H_C$ are located at the ends of the cylindrical stator, and if the rotor is rotated in a direction in which the magnetic pole change point of the corresponding end precedes, transition of an on/off signal occurs at a skew start point of the rotor on which the skew is formed.

In the latter case, the on/off signal combination of the hall sensors $H_A$, $H_B$, and $H_C$ in accordance with the rotation angle of the rotor is as in Table 1 below.

TABLE 1

| CW | | | | CCW | | | |
|---|---|---|---|---|---|---|---|
| Hall sensor signal | | | Degree | Hall sensor signal | | | Degree |
| $H_A$ | $H_B$ | $H_C$ | — | $H_A$ | $H_B$ | $H_C$ | — |
| 0 | 0 | 1 | 180° | 0 | 0 | 1 | 180° |
| 0 | 1 | 1 | 240° | 0 | 1 | 1 | 120° |
| 0 | 1 | 0 | 300° | 0 | 1 | 0 | 60° |
| 1 | 1 | 0 | 0° | 1 | 1 | 0 | 0° |
| 1 | 0 | 0 | 60° | 1 | 0 | 0 | 300° |
| 1 | 0 | 1 | 120° | 1 | 0 | 1 | 240° |

In the above table, CW means an angle for a clockwise rotation, and CCW means an angle for a counterclockwise rotation.

However, it can be known that the rotation angle is sensed only in the unit of 60 degrees through the combination of the on/off signals of the hall sensors $H_A$, $H_B$, and $H_C$.

A scheme for calculating the rotation position more precisely from the on/off signal combinations of the hall sensors $H_A$, $H_B$, and $H_C$ will be presented.

FIG. 4 is a conceptual diagram illustrating a process of calculating a rotation speed and a precise rotation position from on/off signal combinations of the hall sensors $H_A$, $H_B$, and $H_C$, and FIG. 5 is a flowchart for the above-described processes.

As illustrated, in step S100, signals of the hall sensors may be read out at a specific monitoring time interval (e.g., 1 msec), or a signal change from the hall sensor may be waited for. Meanwhile, for more precise position calculation, the number of the monitoring time intervals is counted after transition of the hall sensor signals.

As illustrated, in step S200, the phase of the sine wave may be denoted in a PWM duty ratio. For example, in case of applying a known BLDC motor driving chip to the output circuit 300 of FIG. 2A, the phase of the sine wave of the driving power to be output by the output circuit 300 may be indicated through adjustment of the PWM duty ratio that expresses the sine wave being applied to the output circuit 300.

As illustrated, in step S300, the motor driving power in the form of a sine wave matching the phase expressed by the PWM duty ratio is output.

As illustrated, in step S100, the phase of the driving power sine wave to be output by the output circuit 300 may be indicated at a specific control time interval (e.g., 1 msec). For easy implementation, the monitoring time interval and the control time interval may be equal to each other, but they may be different from each other.

As illustrated, step S100 may be started by a BLDC motor driving operation start (S110) as illustrated in FIG. 5, and in step S100, the hall sensor signals may be received, and counting the specific monitoring time interval (S120) as illustrated in FIG. 5 may be performed.

An angle to be added to the phase angle discriminated in Table 1 as above may be calculated by multiplying the number of the counted monitoring time intervals after the transition of the hall sensor signals by a unit angle obtained by dividing 60 degrees by the number of monitoring time intervals spent by 60-degree rotation through the currently grasped rotation speed.

For this, the rotation signal receiving unit 280 of FIG. 2A receives the on/off signal from the hall sensors disposed on the BLDC motor at a predetermined separation angle, and the controller 200 calculates the rotation speed of the BLDC motor from the time interval of change points of the received on/off signal, and more precisely calculates the relative rotation position from the number of reference time intervals lapsed from the change points of the received on/off signal.

The above-described precise relative rotation position calculation starts when one of the change points of the on/off signal arrives during an initial driving of the BLDC motor, and is performed until two of the change points arrive. In this section, even the torque ripple is weak, and in case of the implementation for quick motor start, the controller 200 may perform switching so that the power being supplied to the coil unit forms a direct current until one or two of the change points of the on/off signal arrive in case of an initial driving of the BLDC motor whose control has been ceased.

The above-described precise rotation position (phase angle) calculation process is performed in step S200 as illustrated, and as illustrated in FIG. 5, the process may be sub-divided into calculating a phase to be added to the phase derived from Table 1 (S210); increasing the phase of the sine wave (driving power waveform) as much as the phase calculated before the transition of the hall sensor signals occurs thereafter (S240); and performing position compensation of the sine wave to the phase derived in Table 1 if the transition of the hall sensor signals occurs (S230).

Mathematical definitions of a speed, a period, resolution, and an additional phase obtained in step S200 as described above are presented in Table 2 below.

TABLE 2

1. Speed calculation: $f = \dfrac{RPM}{60} * PP(\text{Pole pair})$

2. Period calculation: $T = \dfrac{1}{f}$

3. One period resolution per 1 msec: $N = \dfrac{T}{0.001}$ (Per 1 msec)

4. Phase magnitude being added: $\text{Phase} = \dfrac{65534}{N}$ (One period: 65534)

The relationship between the mathematical definitions of Table 2 and sine waves is presented in FIG. 6.

As illustrated, step S300 may be sub-divided into driving the BLDC motor with the power in the sine wave form of the phase calculated in step S200 (S310); identifying whether to receive stop (driving interruption) instructions for the BLDC motor for the control time interval (S320); and interrupting the BLDC motor driving in accordance with the stop instructions (S330). If there is not the stop instructions at step S320, the step may be returned to step S115. If the monitoring time interval and the control time interval are equal to each other, phase calculation (S210) for the next time interval is immediately performed in the returned step S115.

Meanwhile, if the rotation is made in the opposite direction to the above-described direction, the signals of the hall sensors $H_A$, $H_B$, and $H_C$ are transitioned at the end point of the skew, and thus it is controlled to generate the sine wave in a preceding manner for a skew region passing time.

FIG. 7 illustrates an application example of a hollow type BLDC motor system according to an aspect of the present disclosure.

As illustrated, the hollow type BLDC motor system may be applied as a back and forth movement device of a car seat, and is implemented in the form of the hollow type BLDC motor 100 built-in on a rail of the vehicle to perform back and forth movement of an upper rail 620 inside a slide rail 600 for mounting the seat on a floor, and an output circuit 300 and a controller 200 built in the vehicle to control the hollow type BLDC motor 100.

In the illustrated application example, the rotor of the hollow type BLDC motor 100 may join with a spiral guide provided inside the rotor to convert a rotary motion into a linear motion, and thus the upper rail 620 of the slide rail 600 can be moved back and forth.

FIGS. 8A and 8B are graphs illustrating counter electromotive forces and torques during motor driving according to the related art and the present disclosure to explain an improved function of a hollow type BLDC motor system according to an aspect of the present disclosure.

In case of applying the skew to the rotor, the counter electromotive force is similar to the sine wave as indicated by a solid line of the waveform diagram, and if the motor is driven by a square wave 3-phase phase current in the related art as shown in FIG. 8A, a ripple is generated in the torque.

In contrast, if the motor is driven by a sine wave 3-phase phase current as proposed in the present disclosure as shown in FIG. 8B, it can be known that a constant torque is generated with the ripple suppressed in the torque.

FIGS. 9A and 9B are detected waveform diagrams of the above-described torque ripple suppression effect as seen as a current flow of a MOSFET switch element actually driving a hollow type BLDC motor. If the motor is driven with the square wave 3-phase phase current in the related art as shown in FIG. 9A, current flowing through a MOSFET switch appears a square wave form, whereas if the motor is driven with the sine wave 3-phase phase current as proposed in the present disclosure as shown in FIG. 9B, it can be known that the current flowing through the MOSFET switch appears a sine wave form.

Since those skilled in the art to which the present disclosure pertains can embody the present disclosure in other detailed forms without changing the technical idea or essential features of the present disclosure, it should be understood that the above-described embodiments are exemplary in all aspects and are not to be construed as limiting the present disclosure. The scope of the present disclosure is defined by the following claims rather than the detailed description, and it should be construed that all changes or modifications derived from the meaning and the scope of the appended claims and their equivalent concept are included in the scope of the present disclosure.

What is claimed is:

1. A BLDC motor system comprising:
   a motor provided with
      a stator forming a tubular space in which a center shaft exists and having an inner side for the center shaft, on which a plurality of coil units generating a magnetic field are formed, and
      a rotor located in the tubular space and having fixed magnet units arranged on an outer side for the center shaft, on which a plurality of polarities alternate in a rotating direction of the center shaft, a skew having a predetermined slope against the center shaft being formed on a boundary between one of the fixed magnet units and the adjacent fixed magnet unit; and
   a driving module provided with
      a driving circuit supplying a power for driving the motor to the coil units,
      a controller rotating the rotor by switching the driving circuit and performing switching so that the power being supplied from the driving circuit to the coil units forms a sine wave, and
      a rotation signal receiving unit receiving a signal for a relative rotation position between the coil units of the motor and a fixed magnet unit formed on the rotor;
   wherein the rotation signal receiving unit receives an on/off signal from Hall sensors disposed on the motor at a predetermined separation angle,
   wherein the stator is provided with 6 coil units in total, and the rotor is provided with 4 fixed magnet units in total,
   wherein the Hall sensors maintain an electrical angle interval of 120 degrees with each other corresponding to a mechanical interval of 60 degrees,
   wherein the controller calculates the rotation speed of the motor from a time interval of change points of the received on/off signal, and counts a number of monitoring time intervals after an on/off signal transition of the Hall sensors,
   wherein the controller calculates an angle to be added to the phase angle of the power being supplied from the driving circuit to the coil units, and
   wherein the controller calculates the angle to be added by multiplying the counted number of monitoring time intervals by a unit angle obtained by dividing 60 degrees by a number of monitoring time intervals spent by 60 degree rotation through a current rotation speed.

2. The BLDC motor system of claim 1, wherein the sine wave has a phase of 0 degree in case that the coil center shaft of the stator passes through a start point of the skew.

3. The BLDC motor system of claim 1, wherein the rotor joins with a spiral guide provided inside the rotor to convert a rotary motion into a linear motion.

4. A BLDC motor driving device driving a BLDC motor, comprising:
   a driving circuit supplying a power for driving the motor to a coil unit of the BLDC motor;
   a controller rotating a rotor of the BLDC motor by switching the driving circuit and performing switching so that the power being supplied from the driving circuit to the coil unit forms a sine wave; and
   a rotation signal receiving unit receiving a signal for a relative rotation position between the coil unit of the BLDC motor and a fixed magnet unit formed on the rotor,
   wherein the rotation signal receiving unit receives an on/off signal from Hall sensors disposed on the BLDC motor at a predetermined separation angle,
   wherein a stator of the BLDC motor is provided with 6 coil units in total, and the rotor is provided with 4 fixed magnet units in total,
   wherein the Hall sensors maintain an electrical angle interval of 120 degrees with each other corresponding to a mechanical interval of 60 degrees, wherein the controller calculates the rotation speed of the BLDC motor from a time interval of change points of the received on/off signal, and counts a number of monitoring time intervals after an on/off signal transition of the Hall sensors, wherein the controller calculates an angle to be added to the phase angle of the power being supplied from the driving circuit to the coil units, wherein the controller calculates the angle to be added by multiplying the counted number of monitoring time intervals by a unit angle obtained by dividing 60 degrees by a number of monitoring time intervals spent by 60 degree rotation through a current rotation speed.

5. The BLDC motor driving device of claim 4, wherein the controller performs switching so that the power being supplied to the coil unit forms a direct current until one or two of the change points of the on/off signal arrive in case of an initial driving of the BLDC motor whose control has been ceased.

* * * * *